N. J. Templeton,
Bung Cutter.
No. 105,606. Patented July 19, 1870.
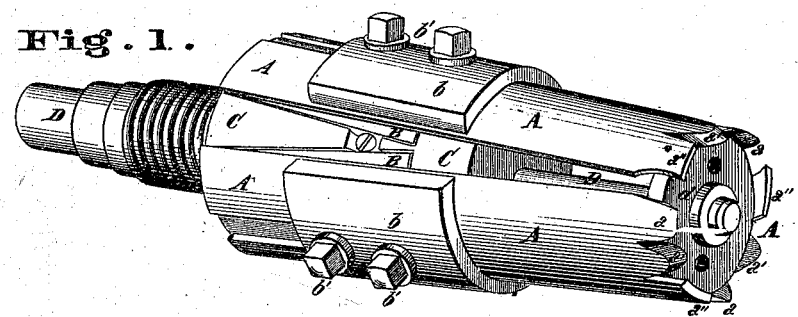
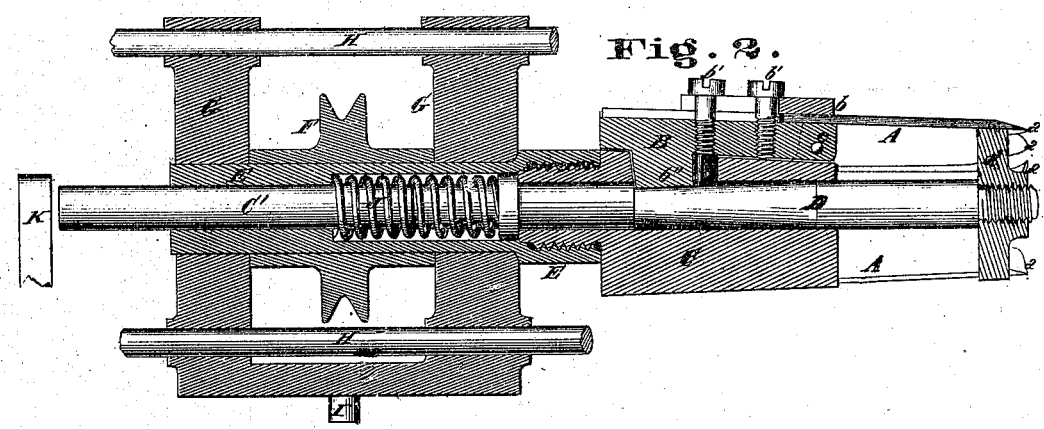
Attest,
John Lemman
John H. Jackson
Inventor.
Nicholas J. Templeton
By F. Millward
Attorney

UNITED STATES PATENT OFFICE.

NICHOLAS J. TEMPLETON, OF CINCINNATI, OHIO.

IMPROVEMENT IN BUNG-CUTTER.

Specification forming part of Letters Patent No. 105,606, dated July 19, 1870.

*To all whom it may concern:*

Be it known that I, NICHOLAS J. TEMPLETON, of Cincinnati, Hamilton county, State of Ohio, have invented certain new and useful Improvements in Cutters for Making Bungs; and I do hereby declare the following to be a sufficiently full, clear, and exact description thereof to enable one skilled in the art to which my invention appertains to make and use it, reference being had to the accompanying drawing, making part of this specification.

My invention relates to the class of cutters designed to cut bungs of tapering form; and consists in a certain peculiar construction of the attachments of the cutter-head, and operations of the same, by which the bung is cut of tapering form by a cut which does not increase or decrease in breadth in its way through the stuff, the hole formed in the stuff by the removal of the bung being of the same conical form as the bung, and but little larger than the bung itself.

My invention further consists in a peculiar construction of the cutters, by which each cutter is provided with two "scoring"-bits inside and outside, and one "routing"-bit.

Figure 1 is a perspective view of a cutter-head and bits embodying my invention. Fig. 2 is an axial section of the same, exhibiting, also, one way of driving and operating the same.

The essential elements of my invention consist of the cutters A, jaws B, pivoted to the cutter head C, and sliding conical spindle D $d$. The cutters A are preferably three in number, and each is formed with three cutting-projections, $a$ $a'$ $a''$, the projection or tooth $a$ being designed to score the outer circle of the cut, and the projection $a'$ to score the inside circle of the cut.

The projection $a''$ is less prominent than the other two, or, in other words, does not project so far. It is designed to rout or remove the stuff between the two scoring-bits. The cutters are firmly secured to the jaws B by means of clamps $b$ and bolts $b'$. Proper recesses are provided in the cutter-head C for the reception of the jaws B, which are pivoted to the head C at $c$. The lugs or ears $b''$ of the jaws B rest upon the conical spindle D, which operates the jaws. The outer end of this spindle carries a disk, $d$, which supports inwardly the outer ends of the cutters A. The sliding motion of the spindle D $d$ serves to expand and contract the cutters A. The head C is secured in the usual manner to the driving-spindle E, which is operated by pulley F.

The frame G, which carries the cutter-spindle E, and in which the latter rotates, is made to slide along the stationary guides H, for the purpose of allowing the cutter to approach and recede from the work. This frame may be reciprocated, for feeding the cutter to the work and withdrawing the same, by a shaft and drum, provided with a cam-groove, in which the pin I is adapted to fit, or by any other preferred way.

A coiled spring, J, is provided in the shaft E, to force out the finished bung and expand the cutters for a new cut. If this spring fails to act, the spindle C' strikes against a stationary object, K, and the bung is thus forcibly thrown off, when the frame G recedes from the stuff.

Operation: The stuff from which the bungs are to be made may be brought to the cutter in long strips, of a width a little in excess of the largest diameter of the bung, and of a thickness equal to the thickness of the bung required. The grain of the wood, therefore, in the bung will be across the diameter.

The stuff may be held and fed in any convenient way.

The cutters A, in entering the stuff, commence forming the largest end of the bung; and, as they are forced in, the stuff forces the spindle D $d$ back, and the conical part of the spindle acts upon the lugs $b''$, so as to contract the diameter of the cutters at the end in the work gradually until the stuff is cut entirely through. The bung is thus cut conically, and yet the cutters remove the stuff immediately in their front only, and not upon the sides, as in other machines. In other words, the cutters are cutting the same width of cut at all times.

When the stuff is cut entirely through, the bung remains inside the cutters until forced out by spring J or spindle C'. The disk $d$ expands the cutters when the bung is being forced off.

I claim—

1. The head C, jaws B b'', cutters A, and conical sliding spindle D d, combined and operating substantially in the manner and for the purpose specified.

2. The cutters A, when constructed with bits a a' a'', as described, and for the purpose specified.

In testimony of which invention I hereunto set my hand.

N. J. TEMPLETON.

Witnesses:
 FRANK MILLWARD,
 J. L. WARTMANN.